US006432530B1

(12) United States Patent
Garcia-Ramirez et al.

(10) Patent No.: US 6,432,530 B1
(45) Date of Patent: Aug. 13, 2002

(54) SOLVENTLESS PLASTICIZER-RESISTANT VINYL ELECTRICAL TAPE

(75) Inventors: Rafael Garcia-Ramirez, Dripping Springs; David V. Mahoney, Austin, both of TX (US); Steven O. Ward, Cottage Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 36 days.

(21) Appl. No.: 09/652,472

(22) Filed: Aug. 31, 2000

(51) Int. Cl.[7] .............................................. B32B 27/38

(52) U.S. Cl. ......................... 428/355 EP; 428/355 BL; 428/343; 428/518

(58) Field of Search .................... 428/355 EP, 355 BL; 522/31, 64, 68, 100, 102, 110, 112, 170, 11

(56) References Cited

U.S. PATENT DOCUMENTS

| | | | | |
|---|---|---|---|---|
| 3,068,117 A | | 12/1962 | Korpman | 117/76 |
| 3,232,785 A | | 2/1966 | Smith | 117/76 |
| 3,661,874 A | | 5/1972 | Olson | 260/83.3 |
| 4,287,013 A | * | 9/1981 | Ronning | 156/242 |
| 4,751,103 A | * | 6/1988 | Goel | 427/54.1 |
| 5,382,604 A | | 1/1995 | Erickson | 522/158 |
| 5,500,293 A | | 3/1996 | Lau et al. | 428/355 |
| 5,536,772 A | | 7/1996 | Dillman et al. | 524/483 |
| 5,667,893 A | | 9/1997 | Kinzer et al. | 428/413 |

FOREIGN PATENT DOCUMENTS

| | | | |
|---|---|---|---|
| JP | 11-263946 | 9/1999 | C09J/7/02 |
| JP | 11-263947 | 9/1999 | C09J/7/02 |
| WO | WO 96/11241 | 4/1996 | C09J/163/08 |

* cited by examiner

*Primary Examiner*—Robert Dawson
*Assistant Examiner*—Christopher M. Keehan
(74) *Attorney, Agent, or Firm*—Darla P. Fonseca

(57) ABSTRACT

A composition useful as a primer layer for a vinyl backed adhesive tape comprising at least one epoxidized conjugated diene polymer having a minimum concentration of epoxidized units of at least about 3% provides increased anchorage of an adhesive to the plasticized vinyl backing.

15 Claims, No Drawings

SOLVENTLESS PLASTICIZER-RESISTANT VINYL ELECTRICAL TAPE

BACKGROUND OF THE INVENTION

1. Field of the Invention

The invention relates to solventless adhesives useful in applications requiring vinyl electrical tape. These adhesives and adhesive tapes provide excellent retention of adhesion properties, and strong anchorage to the plasticized vinyl backing.

2. Description of the Art

Electrical tapes, as well as tapes and adhesive sheets for other applications which require stretching, typically use a polyvinylchloride (vinyl) substrate, upon which the adhesive is coated. This material provides excellent mechanical properties such as elongation. Such vinyl materials are highly plasticized, with some containing up to 60% plasticizers. Typical plasticizers include relatively low-molecular weight oils such as epoxidized soybean oil (ESO), epoxidized linseed oil (ELO), diisononyl phthalate (DNP), diisooctyl phthalate (DOP), and the like.

Vinyl electrical tapes and sheets have traditionally been made by first applying a primer layer such as water based lattices to the vinyl. This primer helps to isolate the vinyl and its plasticizers from the adhesive while providing the required anchorage of these two (in principle) incompatible layers. The primer is dried in an oven. The adhesive layer is then coated from solution and dried in the oven. Such coating and drying operations require expensive ovens, and solvent recovery systems to avoid releasing solvent into the environment. However, this process does produce a high performance product.

It would be extremely advantageous to be able to produce such a vinyl backed tape by means of a solventless process to avoid the environmental and economic issues associated with the solvent process. However, conventional solventless processes have produced tapes having low anchorage of the adhesive to the vinyl backing. Such tapes invariably delaminate at the adhesive-vinyl interface. This is primarily caused by the migration of the plasticizers from the vinyl into the adhesive.

U.S. Pat. No. 5,500,293 discloses adhesives suitable for use in vinyl insulating tapes which comprise a blend of a polyisoprene homopolymer, a styrene-isoprene-styrene copolymer, a tackifying resin, and an end block reinforcing resin.

Japanese Kokai Publication Number 11-263947 discloses migration of plasticizer from vinyl backings to adhesive and resulting delamination. The document discloses a primer that comprises 10 to 150 parts by weight of a thermosetting compound, and a thermosetting initiator. Specifically, a three-dimensional network is disclosed with a thermal polymerization initiator that hardens the primer totally, and obstructs the movement of the plasticizer. The network contains an acrylate-type compound, a urethane acrylate oligomer or monomer, an epoxy acrylate, and a possible a polyester acrylate urethane. Exemplary thermosetting initiators are organic peroxide derivatives, and azo type polymerization initiators, preferable used with an amine polymerization promoter. The use of such a promoter indicates that the compounds are coated from solution.

Japanese Publication 11-263946 discloses an adhesive sheet having a vinyl substrate with a primer coated thereon, and an adhesive laminated to the primer. The primer has an ultraviolet curable compound and an ultraviolet curing initiator. Exemplary compounds include acrylates, urethane acrylates, urethane acrylate oligomers or monomers, epoxy acrylates, and polyester acrylate urethanes.

The present invention provides an primer, and a vinyl tape employing a primer, which does not exhibit adhesive delamination from the backing, but rather shows good adhesive anchorage to the vinyl, and wherein the adhesive is substantially immune to attack by the plasticizers in the backing.

SUMMARY OF THE INVENTION

The invention provides a solventless primer layer for use in an adhesive tape having a plasticized vinyl substrate. Specifically, the primer comprises at least one epoxidized conjugated diene monomer such as a polybutadiene polymers or styrene-butadiene copolymer having a minimum concentration of epoxidized units of about 3 percent.

The invention further provides an adhesive tape formed without the use of solvent comprising a polyvinyl chloride backing bearing on at least one major surface thereof a primer comprising at least one epoxidized conjugated diene polymer such as a butadiene polymer or an epoxidized styrene-butadiene copolymer having a minimum concentration of epoxidized units of at least about 3%.

In one embodiment of the invention, the primer layer comprises at least one compound useful as an ultraviolet (UV) initiator.

Preferred solventless tapes of the invention comprise an adhesive formulation coated onto the primer layer comprising a blend of a polyisoprene homopolymer, a styrene-isoprene-styrene copolymer, and at least one aliphatic tackifying resin.

As used herein, these terms have the following meanings.

1. The terms "vinyl" and "vinyl backing" refer to film forming polymers containing polyvinyl chloride used as substrates for adhesive compositions.
2. The term "primer layer" or "tie-layer" means a layer of a composition of an adhesive tape coated between the backing and an adhesive layer.

As used herein, all parts, percents, and ratios are by weight, unless specifically stated otherwise.

DETAILED DESCRIPTION OF THE INVENTION

Tapes of the invention comprise a vinyl backing, a primer layer, and at least one adhesive layer.

Primer layers of the invention comprise at least one epoxidized polymer formed from conjugated dienes, i.e., butadiene polymers, styrene-butadiene polymers, styrene-isoprene polymers, and butadiene copolymers of acrylonitrile. The double bonds remaining in these polymers and copolymers can be partially of almost completed epoxidized either by preformed peroxy acids or by in-situ methods using hydrogen peroxides and lower aliphatic acids. Performed peroxy acids yield more efficient conversion to oxirane groups with fewer unwanted side reactions. Generally, the unsaturated polymer must be a liquid of relatively low molecular weight or readily soluble in solvents suitable for carrying out epoxidation reactions. Useful epoxidized conjugated dienes have a minimum concentration of epoxidized units of at least about 3%.

Useful commercially available styrene-butadiene copolymers include epoxidized nonhydrogenated styrene-butadiene block copolymer, (e.g., Epofriend™ A1020, A1010, and A1005, Daicel Chemical Industries LTD, Osaka, Japan), and epoxidized hydrogenated styrene-butadiene (SB) block copolymers.

When SB copolymers are used, the styrene block can be formed from polymerization of compounds such as alphamethylstyrene, p-tert-butylstyrene, p-methylstyrene, 4-n-propylstyrene, 2,4-dimethylstyrene, 3,5-diethylstyrene, 1,1-diphenyl-styrene, 2,4,6-trimethyl styrene, 4-cyclohexylstyrene, 3-methyl-5-n-hexyl styrene, and the like, and mixtures thereof. The double bonds in the backbone are derived from polymerization butadiene, 2,3-butadiene, and the like. The copolymerization weight ratio of the aromatic vinyl compound with respect to the butadiene is generally 5/95 to 70/30.

In one embodiment of the invention, the primer also includes an ultraviolet (UV) radiation photoinitiator. Such an initiator will crosslink the primer into a three dimensional network which may include chains from the substrate due to the presence of epoxidized chains (e.g., ELO, ESO) in the substrate. This initiator, when present, comprises up to about 10% preferably up to about 5% of the epoxidized units present. Useful UV initiators include sulfonium phosphate salts and sulfonium antimonate salts. Preferred initiators include triarylsulfonium hexafluorophosphate, triarylsulfonium hexafluoroantiomonate, and the like. In another embodiment of the invention, one or more thermal initiators may be used.

Preferred tapes of the invention comprise an adhesive formed from a blend of a polyisoprene homopolymer, a styrene-isoprene-styrene copolymer, and at least one aliphatic tackifying resin.

Polyisoprene homopolymers useful in such adhesive compositions include those comprised of cis- 1,4 structures produced by polymerization with a Ziegler or lithium catalyst. Some trans-1,4 polyisoprene may also be present in the homopolymer, however, predominantly cis-1,4 homopolyisoprene polymers are preferred.

Preferred adhesive compositions contain from about 13% to about 42% polyisoprene homopolymer, preferably from about 20% to about 35%. Commercially available examples include those available from Shell Chemical Company under the trade name Cariflex™ and those available from Goodyear Tire and Rubber Co. under the trade name Natsyn™.

Blended with the polyisoprene homopolymer is from about 13% to about 42%, preferably from about a 20% to about 35%, of a styrene-isoprene-styrene A-B-A block copolymer. Typical configurations for such a copolymer include linear triblock, radial branched and tapered geometries. The "A" block is rigid at the applications temperatures while the "B" block is usually elastomeric at application temperatures. Useful copolymers include those in which the "A" block is polystyrene, alphamethyl styrene, t-butyl styrene, or other ring alkylated structures, or mixtures thereof. "B" is an elastomeric conjugated diene having an average molecular weight of from about 5,000 to about 500,000. Other dienes may be added in minor amounts. Commercially available examples include those available from Shell Chemical Company under the trade name Kraton™, including Kraton™ 1107; those available from Exxon Chemical Company under the trade name Vector™, and those available from EniChem Elastomers under the trade name Europrene™.

Preferred adhesive compositions also contain from about 2% to about 20% of an end block reinforcing resin, preferably from about 5% to about 15%. The reinforcing end block resin is an aromatic, essentially hydrocarbon resin, which generally has a glass transition temperature higher than that of the adhesive application temperature. Generally, the aromatic resin is compatible with and associated with the vinyl arene end blocks of the block copolymer. Useful resins include low molecular weight oligomers and polymers of styrene and α-methylstyrene and paramethyl styrene, and copolymers thereof. Commercially available examples include Endex™ 155 and 160, Kristalex™ 5140, and 1120, all available from Hercules, Inc.

Preferred adhesives also include a solid tackifying agent such as a rosin ester, hydrogenated rosin ester, polyterpene resin, polymerized hydrocarbon resin containing form about 4 to about 6 carbon atoms, polymerized C9 hydrocarbon resins, and the like. Commercially available examples include Wingtack™ Plus from Goodyear Tire and Rubber Company, Escorez™ 1310 from Exxon Chemical Company, and Piccolyte™ A135 from Hercules. The tackifying resin or mixture thereof is present in the adhesive at amounts of from about 25% to about 55%, preferably from about 30% to about 45%.

Further crosslinking agents may also be included, such as a multifunctional (meth)acrylate, e.g., butanediol diacrylate or hexanediol diacrylate, or other multifinctional crosslinker such as divinylbenzene. When used, the crosslinker(s) is(are) added at a level of up to about 1 percent, preferably up to about 0.5 percent, of the total polymerizable composition.

Examples of such initiators include azo compounds, hydroperoxides, peroxides, and the like, and photoinitiators such as benzophenone, benzoin ethyl ether, and 2,2-dimethoxy-2-phenyl acetophenone.

Adhesives of the invention may also comprise other adjuvants, when used in minor amounts so as not to affect the adhesion of the adhesive. Such adjuvants include other crosslinking agents, antioxidants, heat stabilizers, pigments, coloring agents and the like.

Tapes of the invention may be produced by extrusion of the primer layer, followed by lamination to the backing. The primer is then subjected to ultraviolet radiation. The adhesive layer may be also extruded and laminated atop the primer layer. Alternatively, if the adhesive is transparent to ultraviolet radiation, both layers may be co-extruded onto the backing, followed by exposure to the ultraviolet radiation. Other solventless processes would also be useful in forming tapes of the invention.

The adhesive should be deposited by a solventless method, preferably extruded, either alone onto an easily removable surface for lamination to the backing and primer, or co-extruded, as mentioned above. However, if the adhesive coating able to be hot melt extruded, the coating may be carried out by conventional methods such as knife coating, Meyer bar coating, knurled roll, and other conventional means known in the art for coating adhesives. Such processes usually involve a carrier, but the carrier may be nonsolvent based, such as in a latex. The adhesive may be coated to a thickness of from about 10 $\mu$m to about 125 $\mu$m.

The film may be commercialized in roll form, or may be divided into segments for sale, such as die-cut geometric shapes. Additionally, the adhesive may be provided between two substrates, e.g., the adhesive is coated onto a film substrate which may be provided on a low adhesion backsize or other easily removable surface for individual use.

These and other aspects of the invention are illustrated by the following examples which should not be viewed as limiting in scope.

EXAMPLES

TABLE 1

| Composition of PVC Backing | |
|---|---|
| Ingredient | Concentration (parts) |
| PVC powder resin | 100 |
| Plasticizers | 40–60 |
| Thermal Stabilizes | 2–5 |
| Other Additives | 2–5 |
| Total | 144–170 |

TABLE 2

| Backing Blends | | | |
|---|---|---|---|
| Blend | Epoxidized Polymer | Molecular Weight (MW) | Initiator (wt %) |
| 1 | S-B-S | 61,000 | — |
| 2 | S-B-S | 61,000 | 3 |
| 3 | Bd | 4,400 | 3 |

Examples 1 and 2

Vinyl tapes were made using a primer of the invention and a styrene-isoprene-styrene adhesive. A composition in the range of Table 1 was used to form the PVC backing. Blends 1 and 2 were used for the primer. The tape was formed by three layer co-extrusion, i.e., co-extruding the backing, the primer and the adhesive simultaneously. In the case of Blend 2, samples of the tape were subsequently irradiated with UV light. The tapes were then tested for adhesion to steel, backing adhesion both immediately and after aging at 65° C. for 10 days. The properties were measured according to ASTM-1000. The properties are listed in Table 3. Tapes produced using Blend 2, however, showed increased resistance for forced removal of the adhesive/primer layer from the backing indicating that the crosslinked system possibly also involved some epoxidized chains from the plasticizers present in the backing.

TABLE 3

| 3-Layer Co-Extruded Vinyl Electrical Tape | | |
|---|---|---|
| Property | Units | Value |
| Adhesion to Steel | oz/in | 36 |
| Adhesion to Backing | oz/in | 29 |
| Aged Adhesion to Steel* | oz/in | 26 |
| Aged Adhesion to Backing* | oz/in | 13 |
| Overall Thickness | in | 0.0073 |
| Backing Thickness | in | 0.0057 |
| Primer Thickness | in | 0.00023 |
| Adhesive Thickness | in | 0.00137 |

*Rolls aged at 65° C. for 10 days

Examples 3–7

Five additional examples of three layer co-extruded tape were tested for tensile strength and elongation at break. Requirements for agency certification in both along the machine direction and across the machine directions requirements are 2000 psi (minimum) and 100% (minimum) for tensile strength and elongation at break, respectively.

Example 8

Samples of the tape were also produced using Blend 3 as the primer composition. These samples were produced using a laboratory "handspread" type of coating apparatus to coat the primer, followed by UV irradiation and subsequent lamination of a styrene-isoprene styrene adhesive, using a hot press at about 80° C. Crosslinking of the primer on exposure to UV was evident by solidification. Good anchorage to the backing was also obtained. Two-bond (adhesive stripping test) testing of the samples revealed a lower cohesive strength of the primer layer as compared to the previous examples. The concept of crosslinking of a low molecule weight epoxidized polymer was demonstrated.

| Example | Elongation @ break (%) | Tensile strength (psi) |
|---|---|---|
| 2 | 275 | 2500 |
| 3 | 310 | 2700 |
| 4 | 330 | 2800 |
| 5 | 325 | 3015 |
| 6 | 340 | 3013 |

What is claimed is:

1. An adhesive tape comprising a plasticized polyvinyl cbloride backing bearing on at least one major surface thereof a solventless primer comprising at least one epoxidized conjugated diene polymer having a minimum concentration of epoxidized units of at least about 3%, said primer bearing thereon an adhesive.

2. An adhesive tape comprising a plasticized polyvinyl chloride backing bearing on at least one major surface thereof a solventless primer comprising at least one epoxidized styrene-butadiene copolymer having a minimum concentration of epoxidized units of at least about 3%, said primer bearing thereon an adhesive.

3. An adhesive tape comprising a plasticized polyvinyl chloride backing bearing on at least one major surface thereof a solventless primer comprising at least one epoxidized polybutadiene copolymer having a minimum concentration of epoxidized units of at least about 3%, said primer bearing thereon an adhesive.

4. An adhesive tape according to claim 1 wherein said epoxidized units comprise from about 5% to about 10% of said copolymer.

5. An adhesive tape according to claim 1 further comprising up to about 10% of at least one ultraviolet radiation photoinitiator.

6. An adhesive tape according to claim 2 wherein said epoxidized units comprise from about 5% to about 10% of said copolymer.

7. An adhesive tape according to claim 2 further comprising at least one ultraviolet radiation photoinitiator, said photoinitiator being present in an amount of up to about 10% of the concentration of the epoxidized units.

8. An adhesive tape according to claim 3 wherein said epoxidized units comprise from about 5% to about 10% of said copolymer.

9. An adhesive tape according to claim 3 further comprising up to about 10% of at least one ultraviolet radiation photoinitiator.

10. An adhesive tape according to claim 5 further comprising at least one ultraviolet radiation photoinitiator, said photoinitiator being present in amount of up to about 10% of the concentration of the epoxidized units.

11. An adhesive tape according to claim 5 wherein said photoinitiator is selected from the group consisting of sulfonium phosphate and sulfonium antimonate salts.

12. An adhesive tape according to claim 1 wherein said adhesive is selected from the group consisting of styrene-butadiene rubber adhesives, and styrene-isoprene-styrene adhesives, and polyisoprene adhesives.

13. An adhesive tape according to claim 2 wherein said adhesive is selected from the group consisting of styrene-butadiene rubber adhesives, and styrene-isoprene-styrene adhesives, and polyisoprene adhesives.

14. An adhesive tape according to claim 3 wherein said adhesive is selected from the group consisting of styrene-butadiene rubber adhesives, and styrene-isoprene-styrene adhesives, and polyisoprene adhesives.

15. An adhesive tape according to claim 2 further comprising at least one ultraviolet radiation photoinitiator, said photoinitiator being present in an amount of from about 3% to about 10% of the concentration of the epoxidized units.

* * * * *